US011052747B2

(12) United States Patent
Ore (10) Patent No.: US 11,052,747 B2
(45) Date of Patent: Jul. 6, 2021

(54) MULTI-MODE POWERTRAINS

(71) Applicant: Deere & Company, Moline, IL (US)

(72) Inventor: Thomas G. Ore, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/971,867

(22) Filed: May 4, 2018

(65) Prior Publication Data

US 2019/0337376 A1 Nov. 7, 2019

(51) Int. Cl.
| | |
|---|---|
| *B60K 6/445* | (2007.10) |
| *B60K 6/44* | (2007.10) |
| *F16H 3/72* | (2006.01) |
| *B60K 6/365* | (2007.10) |
| *B60K 6/543* | (2007.10) |
| *F16H 37/08* | (2006.01) |

(52) U.S. Cl.
CPC .............. *B60K 6/445* (2013.01); *B60K 6/365* (2013.01); *B60K 6/44* (2013.01); *B60K 6/543* (2013.01); *F16H 3/728* (2013.01); *F16H 37/084* (2013.01); *B60Y 2200/221* (2013.01); *B60Y 2200/92* (2013.01); *F16H 2037/0886* (2013.01)

(58) Field of Classification Search
CPC ............ F16H 3/728; F16H 2200/2007; F16H 2037/088; F16H 2037/0886; B60K 6/365; B60K 6/445; B60K 6/543
See application file for complete search history.

(56) References Cited

U.S. PATENT DOCUMENTS

| | | | |
|---|---|---|---|
| 3,214,987 A | 11/1965 | Schenck et al. | |
| 3,626,787 A | 12/1971 | Singer | |
| 3,651,904 A | 3/1972 | Snoy et al. | |
| 3,714,845 A | 2/1973 | Mooney, Jr. | |

(Continued)

FOREIGN PATENT DOCUMENTS

| | | |
|---|---|---|
| AT | 11545 U1 | 12/2010 |
| CN | 101255907 A | 9/2008 |

(Continued)

OTHER PUBLICATIONS

Deere & Company, Utility U.S. Appl. No. 15/879,796, filed Jan. 25, 2018.

(Continued)

*Primary Examiner* — Erin D Bishop
(74) *Attorney, Agent, or Firm* — Klintworth & Rozenblat IP LLP (57) ABSTRACT

A powertrain has an engine, a continuously variable power source (CVP), an output shaft and a transmission configured to provide selection between a plurality of transmission modes. The transmission includes a variator, with first and second output members, that is operably connected to the engine and the CVP and forward, reverse, first speed and second speed transmission components, each having an engaged position and a disengaged position. The transmission configured to provide at least first and second forward transmission modes and a reverse transmission mode in each of which combined power from the engine and the CVP rotates the output shaft. The forward, first speed and second speed transmission components are substantially coaxial with the output members of the variator.

15 Claims, 7 Drawing Sheets

(56) References Cited

U.S. PATENT DOCUMENTS

| | | | |
|---|---|---|---|
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,156,577 | A | 10/1992 | Fredriksen et al. |
| 5,353,662 | A | 10/1994 | Vaughters |
| 5,508,574 | A | 4/1996 | Vlock |
| 5,931,757 | A | 8/1999 | Schmidt |
| 6,394,925 | B1 * | 5/2002 | Wontner ............ F16H 47/04 475/80 |
| 6,478,705 | B1 | 11/2002 | Holmes et al. |
| 6,684,148 | B2 | 1/2004 | Chess |
| 7,008,342 | B2 | 3/2006 | Dyck et al. |
| 7,252,611 | B2 | 8/2007 | Raghavan et al. |
| 7,294,079 | B2 | 11/2007 | Raghavan et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan |
| 7,479,081 | B2 | 1/2009 | Holmes |
| 7,491,144 | B2 | 2/2009 | Conlon |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,660,724 | B2 | 2/2014 | Tarasinski et al. |
| 8,734,281 | B2 | 5/2014 | Ai et al. |
| 8,747,266 | B2 | 6/2014 | Aitzetmueller |
| 8,784,246 | B2 | 7/2014 | Treichel |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,097,342 | B2 | 8/2015 | Dix et al. |
| 9,206,885 | B2 | 12/2015 | Rekow et al. |
| 9,487,073 | B2 | 11/2016 | Love |
| 9,562,592 | B2 | 2/2017 | Rekow et al. |
| 9,944,163 | B2 | 4/2018 | McKinzie |
| 9,981,665 | B2 | 5/2018 | Rekow et al. |
| 10,119,598 | B2 | 11/2018 | Rekow et al. |
| 2003/0186769 | A1 | 10/2003 | Ai et al. |
| 2004/0094381 | A1 | 5/2004 | Versteyhe |
| 2005/0049100 | A1 | 3/2005 | Ai et al. |
| 2006/0046886 | A1 | 3/2006 | Holmes et al. |
| 2006/0111212 | A9 | 5/2006 | Ai et al. |
| 2006/0142104 | A1 | 6/2006 | Sailer |
| 2006/0276291 | A1 | 12/2006 | Fabry et al. |
| 2007/0021256 | A1 | 1/2007 | Klemen et al. |
| 2007/0021257 | A1 | 1/2007 | Klemen et al. |
| 2007/0249455 | A1 | 10/2007 | Hasegawa et al. |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller |
| 2013/0023370 | A1 | 1/2013 | Grad et al. |
| 2014/0018201 | A1 | 1/2014 | Tolksdorf |
| 2014/0128196 | A1 | 5/2014 | Rintoo |
| 2014/0248986 | A1 | 9/2014 | Weeramantry et al. |
| 2014/0315685 | A1 | 10/2014 | Hofler |
| 2015/0006007 | A1 | 1/2015 | Kitahata |
| 2015/0072823 | A1 | 3/2015 | Rintoo |
| 2015/0142232 | A1 | 5/2015 | Tabata et al. |
| 2015/0183436 | A1 | 7/2015 | Rekow et al. |
| 2015/0184726 | A1 | 7/2015 | Rekow et al. |
| 2015/0292608 | A1 | 10/2015 | McKinzie |
| 2016/0090091 | A1 | 3/2016 | Gugel et al. |
| 2016/0201295 | A1 | 7/2016 | Kishimoto et al. |
| 2016/0272059 | A1 * | 9/2016 | Watanabe ............ B60K 6/365 |
| 2017/0102059 | A1 * | 4/2017 | Rekow ............ F16H 3/728 |
| 2017/0284508 | A1 | 10/2017 | Devreese |
| 2017/0284517 | A1 | 10/2017 | Rekow et al. |
| 2017/0328453 | A1 | 11/2017 | McKenzie |
| 2018/0043764 | A1 | 2/2018 | McKenzie et al. |
| 2018/0149247 | A1 | 5/2018 | Rekow et al. |
| 2018/0298993 | A1 | 10/2018 | Fliearman et al. |

FOREIGN PATENT DOCUMENTS

| | | |
|---|---|---|
| CN | 102844588 A | 12/2012 |
| DE | 1173348 B | 7/1964 |
| DE | 4010919 A1 | 10/1991 |
| DE | 19621200 A1 | 11/1997 |
| DE | 19954636 A1 | 5/2001 |
| DE | 10128076 A1 | 12/2002 |
| DE | 10319252 A1 | 11/2004 |
| DE | 112006002537 T5 | 9/2008 |
| DE | 202009007972 U1 | 6/2010 |
| DE | 102010026460 A1 | 3/2011 |
| DE | 102012216781 A1 | 3/2011 |
| DE | 102008032320 A1 | 6/2011 |
| DE | 102010021846 A1 | 12/2011 |
| DE | 102011102184 A1 | 7/2012 |
| DE | 102011102210 A1 | 7/2012 |
| DE | 102011105868 A1 | 1/2013 |
| DE | 102011115002 A1 | 4/2013 |
| DE | 102013220167 A1 | 4/2015 |
| DE | 202015102282 U1 | 6/2015 |
| DE | 102014225298 A1 | 7/2015 |
| DE | 102015215461 A1 | 2/2016 |
| DE | 102015200973 A1 | 7/2016 |
| DE | 102015205932 A1 | 10/2016 |
| DE | 102016120965 A1 | 5/2017 |
| DE | 102016204727 A1 | 9/2017 |
| DE | 102006041160 A1 | 9/2018 |
| DE | 102018108510 A1 | 10/2018 |
| DE | 102018212712 A1 | 1/2019 |
| DE | 102018213871 A1 | 2/2020 |
| EP | 805059 A2 | 5/1997 |
| EP | 1099882 A2 | 5/2001 |
| EP | 1707416 B1 | 8/2007 |
| EP | 02466168 | 6/2012 |
| EP | 02466169 | 6/2012 |
| EP | 2855226 B1 | 9/2018 |
| JP | 6462174 B1 | 1/2019 |
| WO | 2008019799 A2 | 2/2008 |
| WO | 2011092643 A1 | 8/2011 |
| WO | 2012171812 | 12/2012 |
| WO | 2017107848 A1 | 6/2017 |

OTHER PUBLICATIONS

Deere & Company, Utility U.S. Appl. No. 15/977,242, filed May 11, 2018.

Deere & Company, Utility U.S. Appl. No. 16/371,598, filed Apr. 1, 2019.

German Search Report for application No. 1020182099405 dated Feb. 28, 2019.

German Search Report for application No. 10215206174 dated Jul. 16, 2015.

German Search Report for application No. 1020182036705 dated Dec. 20, 2018.

German Search Report for application No. 102018210616 dated Feb. 1, 2019.

German Search Report for application No. 1020182099391 dated Feb. 27, 2019.

German Search Report for application No. 102018212712 dated Apr. 12, 2019.

CNIPA Office Action for Application No. 201510165982.4 dated Aug. 9, 2018, Serial Notice No. 2018080601675890.

USPTO, Office Action in U.S. Appl. No. 15/664,289 dated Jul. 26, 2018.

USPTO, Office Action in U.S. Appl. No. 14/249,258 dated Apr. 21, 2017.

(56) References Cited

OTHER PUBLICATIONS

USPTO, Office Action in U.S. Appl. No. 15/664,289 dated Dec. 13, 2018.
USPTO, Office Action in U.S. Appl. No. 14/249,258 dated Oct. 17, 2016.
USPTO, Office Action in U.S. Appl. No. 14/249,258 dated Aug. 22, 2017.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in U.S. Appl. No. 14/536,097 dated Sep. 25, 2017.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
USPTO, Non-Final Office Action issued in pending Utility U.S. Appl. No. 15/628,979 dated Nov. 3, 2019.
Deere & Company, (Rekow et al.) pending Utility U.S. Appl. No. 15/879,796, Multi-Mode Infinitely Variable Transmission, filed Jan. 25, 2018.
German Search Report for application No. 102019205211 dated Sep. 5, 2019.
German Search Report for application No. 102019204706.8 dated Dec. 17, 2019.
German Search Report for German application No. 102020202651.3 dated Sep. 1, 2020.
USPTO, Office Action in U.S. Appl. No. 16/371,598 dated Jul. 21, 2020.
USPTO, Non-Final Office Action issued in U.S. Appl. No. 16/555,913 dated Jan. 4, 2021.
German Search Report issued in application No. 102020213675.0 dated Mar. 17, 2021. (10 pages).
USPTO, Final Office Action issued in U.S. Appl. No. 16/555,913 dated Apr. 20, 2021.
German Search Report issued in counterpart application No. 102020209003.3 dated Apr. 15, 2021 (10 pages).

\* cited by examiner

MULTI-MODE POWERTRAINS

STATEMENT OF FEDERALLY SPONSORED RESEARCH OR DEVELOPMENT

Not applicable.

CROSS-REFERENCE TO RELATED APPLICATION(S)

Not applicable.

FIELD OF THE DISCLOSURE

This disclosure relates to powertrains, including powertrains for the operation of work vehicles for agricultural, forestry, construction, and other applications.

BACKGROUND OF THE DISCLOSURE

It may be useful, in a variety of settings, to utilize both a traditional engine (e.g., an internal combustion engine) and at least one continuously variable power source ("CVP") (e.g., an electric motor/generator or hydraulic motor/pump, and so on) to provide useful power to an output member. For example, a portion of engine power may be diverted to drive a first CVP, which may in turn drive a second CVP. Power from the engine and/or the second CVP may be delivered to the output member (e.g., a vehicle axle or other output shaft). The engine, the CVP(s), and the output member may be operatively connected via an infinitely variable transmission ("IVT") or continuously variable transmission ("CVT").

Many CVTs have disadvantages. For example, some CVTs may not provide sufficient power delivery for some operating conditions. Other CVTs may decrease operating efficiency, causing the fuel consumption to be high. Also, some CVTs may be overly complicated, may contain an excessive amount of parts, and/or may be difficult to assemble and repair. As such, manufacture and maintenance of these CVTs may be inefficient. Furthermore, these CVTs may be bulky and packaging the CVT on a work vehicle can be difficult.

SUMMARY OF THE DISCLOSURE

A powertrain is disclosed that includes an engine, a continuously variable power source (CVP), an output shaft, and a transmission. The transmission is configured to provide selection between one of a plurality of transmission modes in which the transmission transmits power from at least one of the engine and the CVP to the output shaft. The transmission includes a variator that is operably connected to the engine and the CVP. The variator includes at least one variator output member configured to rotate under power from at least one of the engine and the CVP. The transmission includes a first transmission component and a second transmission component, both having an engaged position and a disengaged position. The plurality of transmission modes includes a first transmission mode in which the second transmission component is in the disengaged position and the first transmission component is in the engaged position to transmit power from the at least one variator output member toward the output shaft to drivingly rotate the output shaft within a first speed range. The plurality of transmission modes includes a second transmission mode in which the first transmission component is in the disengaged position and the second transmission component is in the engaged position to transmit power from the at least one variator output member toward the output shaft to drivingly rotate the output shaft within a second speed range. The second speed range is higher than the first speed range. The first transmission component and the second transmission component are substantially coaxial with the at least one variator output member.

Also, a powertrain is disclosed that includes an engine with an engine shaft. The powertrain also includes an output shaft that is substantially parallel to and spaced apart at a distance from the engine shaft. Moreover, the powertrain includes a continuously variable power source (CVP). Additionally, the powertrain includes a transmission configured to provide selection between one of a plurality of transmission modes in which the transmission transmits power from at least one of the engine and the CVP to the output shaft. The transmission includes a variator that is operably connected to the engine and the CVP. The transmission also includes a first transmission component and a second transmission component, both configured to engage for power transmission from the variator to the output shaft, both configured to disengage to disconnect the variator from the output shaft. The plurality of transmission modes includes a first transmission mode in which the second transmission component is disengaged and the first transmission component is engaged to transmit power from the variator toward the output shaft to drivingly rotate the output shaft. The plurality of transmission modes includes a second transmission mode in which the first transmission component is disengaged and the second transmission component is engaged to transmit power from the variator toward the output shaft to drivingly rotate the output shaft. The variator, the first transmission component, and the second transmission component are substantially coaxial with the output shaft.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed powertrain (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if a substantive portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

The continuously variable transmission (CVT) of the present disclosure may provide a plurality of different modes. For example, a "split-path" power transmission mode may be provided, in which power from both the engine and a CVP is combined for delivery of useful power to the output member. This is called "split-path" power transmission because it is split between a direct mechanical path from the engine and an infinitely/continuously variable path through one or more CVPs. In additional embodiments, useful power may be provided by a CVP but not by the engine (except to the extent the engine drives the CVP). This may be referred to as "CVP-only" power transmission. Finally, in some embodiments, useful power may be provided by the engine (e.g., via various mechanical transmission elements, such as shafts and gears), but not by a CVP. This may be referred to as "mechanical-path" power delivery.

In certain embodiments, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

In the use of continuously (or infinitely) variable powertrains, the relative efficiency of power transmission in various modes may be of some concern. It will be understood, for example, that energy losses may inhere in each step of using a first CVP to convert rotational power from the engine into electrical or hydraulic power, transmitting the converted power to a second CVP, and then converting the transmitted power back to rotational power. In this light, mechanical transmission of power directly from an engine (i.e., in mechanical-path transmission mode) may be considered a highly efficient mode of power transmission, whereas transmission of power through a CVP (e.g., in a split-path transmission mode or a CVP-only transmission mode) may be less efficient. Accordingly, in certain circumstances it may be desirable to utilize mechanical-path transmission mode rather than a split-path mode or CVP-only mode. However, in other circumstances, the flexibility and other advantages provided by use of CVPs may outweigh the inherent energy losses of a split-path or CVP-only mode.

Among other advantages, the powertrains disclosed herein may usefully facilitate transition between split-path, mechanical-path, and CVP-only modes for a vehicle or other powered platform. For example, through appropriate arrangement and control of various gear sets, shafts and clutches, the disclosed powertrain may allow a vehicle to be easily transitioned between any of the three modes, depending on the needs of a particular operation.

The CVT of the present disclosure may also provide a plurality of modes that provide different output speed ranges. For example, in some embodiments, a first split-path mode and a second split-path mode may be provided. The first split-path mode may provide lower output speed ranges than the second split-path mode.

A control set may be provided for selectively changing between a plurality of modes. The control set may include clutches, brakes, and/or other components that can be selectively engaged and disengaged for changing the mode of the transmission. The control set may enable selective switching between the mechanical-path transmission mode, the split-path mode, and the CVP-only mode.

In some embodiments, a CVT of the present disclosure may include at least one CVP-only mode and at least one split-path field mode. In some embodiments, the CVT may additionally provide at least one mechanical-only mode.

In some embodiments, the CVT may be constructed such that the CVT maintains torque at the output shaft and a rotational speed of zero. This may be referred to as "powered-zero". This mode may also allow the output shaft to rotate at low rotational speeds. This may be referred to as a "creeper mode". In some embodiments, the powered-zero and creeper modes may be CVP-only modes. The CVT may also provide one or more "field modes" for moving the work vehicle at higher speeds. In some embodiments, there may be a plurality of field modes, each providing different ground speed ranges for the work vehicle. Furthermore, in some embodiments, the CVT may provide at least one forward mode (for moving the work vehicle in a forward direction) and at least one reverse mode (for moving the work vehicle is a reverse direction).

The CVT of the present disclosure may provide various advantages. For example, the CVT may be relatively compact. Also, the CVT may provide a plurality of modes for the work vehicle for operations in a variety of conditions. Furthermore, the CVT may provide high manufacturability.

Figure 1:
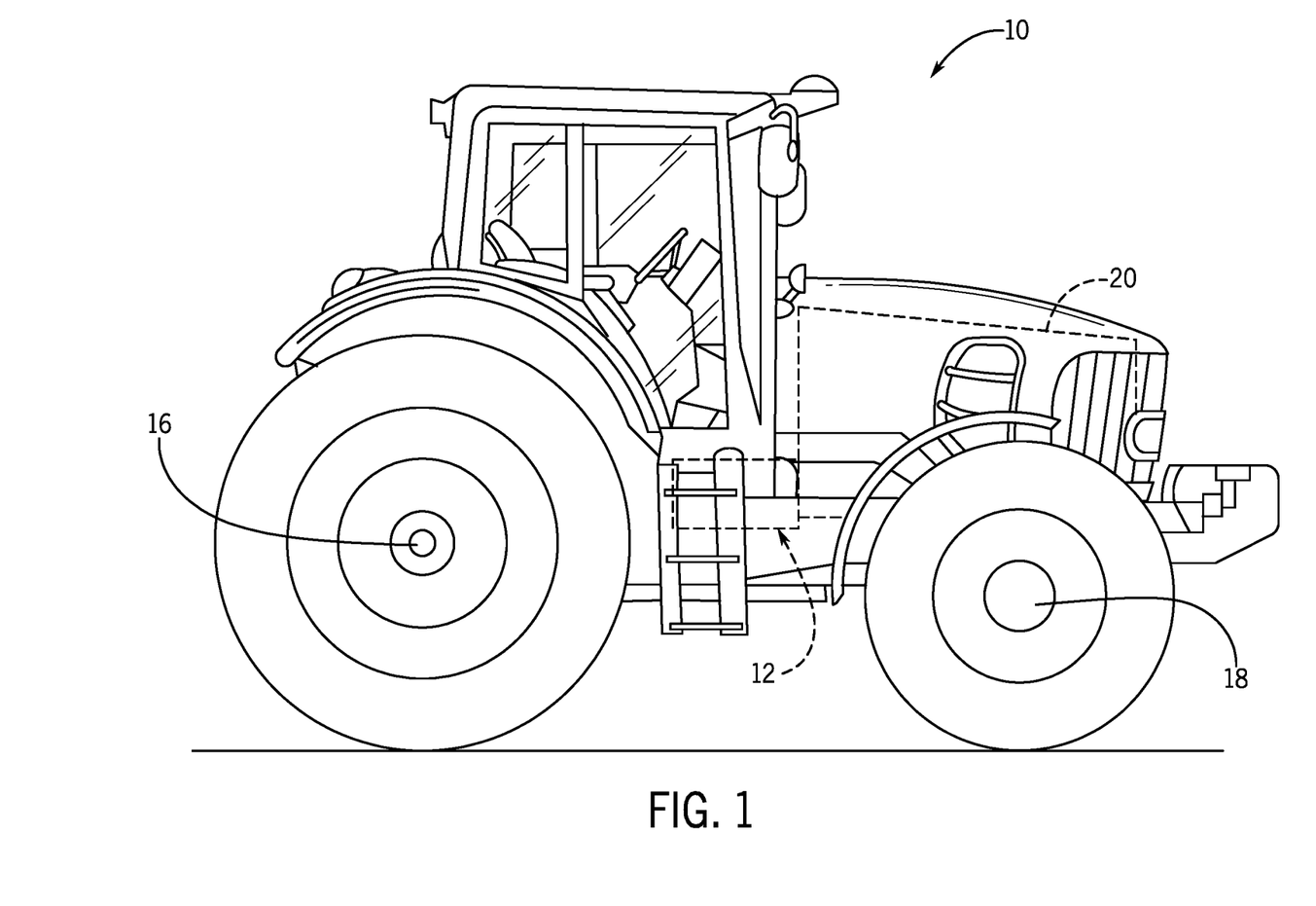
FIG. 1 is a side view of a work vehicle according to example embodiments of the present disclosure.

As will become apparent from the discussion herein, the disclosed powertrain may be used advantageously in a variety of settings and with a variety of machinery. For example, referring now to FIG. 1, an example of the disclosed powertrains may be included in a work vehicle 10. In FIG. 1, the work vehicle 10 is depicted as a tractor with a powertrain 12 (shown schematically). It will be understood, however, that other configurations may be possible, including configurations with the vehicle 10 as a different kind of tractor, a harvester, a log skidder, a grader, or one of various other work vehicle types. It will further be understood that the disclosed powertrains may also be used in non-work vehicles and non-vehicle applications (e.g., fixed-location power installations).

Generally, the powertrain 12 may be configured to generate power and to transmit the power from an engine 20 and/or other power sources to an output member (e.g., an output shaft). In some embodiments, the powertrain 12 may transmit the power to a rear axle 16 and/or to a front axle 18 of the work vehicle 10. However, the powertrain 12 may be configured for delivering power to a power take-off shaft for powering an implement that is supported on the vehicle 10 or that is supported on a separate vehicle. It will be appreciated that the powertrain 12 may be configured for delivering power to other power sinks without departing from the scope of the present disclosure.

Figure 2:
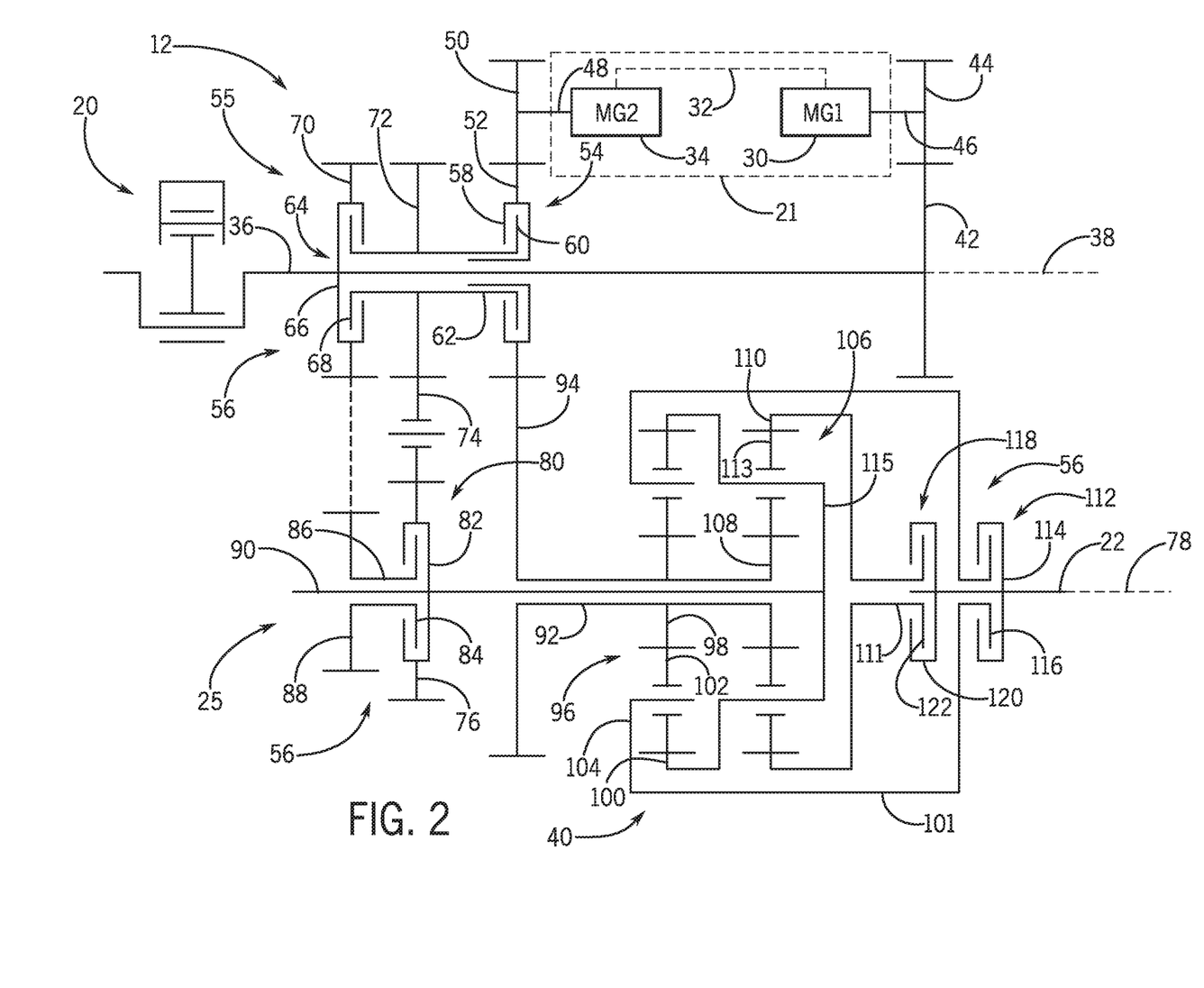
FIG. 2 is a schematic view of a multi-mode continuously variable transmission (CVT) of the present disclosure according to an example embodiment.

Referring now to FIG. 2, an example configuration of the powertrain 12 is depicted schematically. The powertrain 12 may include the engine 20, which may be an internal combustion engine of various known configurations. The powertrain 12 may also include a continuously variable power source CVP 21. The CVP 21 may include at least one continuously variable machine (CVM), such as an electrical machine or a hydraulic machine. In the embodiment shown, the CVP 21 includes a first CVM 30 and a second CVM 34. As shown in FIG. 2, the first CVM 30 may be operably connected to the second CVM 34 via a conduit 32, such as one or more electrical wires.

The powertrain 12 may also include an output shaft 22 or other output member. The output shaft 22 may comprise or may be directly connected to one or more power sinks (e.g., one or both axles 16, 18, power take-off ("PTO") shafts, and so on) of the vehicle 10. In certain embodiments, a torque converter or other device may be included between the engine 20 and the shaft 22 (or another shaft (not shown)), although such a device is not necessary for the operation of the powertrain 12, as contemplated by this disclosure. Further, in certain embodiments, multiple shafts (not shown), including various shafts interconnected by various gears or other power transmission components, or equivalent power transmission components (e.g., chains, belts, and so on) may be included.

The powertrain 12 may further include a transmission 25. The transmission may include a plurality of components, such as shafts, gears, gearsets, clutches, brakes, and/or other components that interconnect the engine 20, the CVP 21, and the output shaft 22 as will be discussed in detail below. The transmission 25 may be considered a continuously variable transmission or an infinitely variable transmission. Also, the transmission 25 may be configured to provide selection between one of the plurality of transmission modes in which the transmission 25 transmits power from the engine 20 and/or the CVP 21 to the output shaft 22.

Accordingly, the engine 20 may provide rotational power to the output shaft 22 via the transmission 25. The engine 20 may also provide rotational power to the first CVM 30 via the transmission 25. Continuing, the first CVM 30 may convert the received power to an alternate form (e.g., electrical or hydraulic power) for transmission over the conduit 32. This converted and transmitted power may be received by the second CVM 34 and then re-converted by the second CVM 34 to provide a rotational power output. Various known control devices (not shown) may be provided to regulate such conversion, transmission, re-conversion and so on.

In some embodiments, the first CVM 30 and the second CVM 34 are both electrical machines. Also, in some embodiments, the first and/or second CVMs 30, 34 may be configured to operate as a motor (to output mechanical power from electrical input power) and as a generator (to output electrical power from mechanical input power).

The transmission 25 may include a variator 40 that is operably connected to the engine 20 and the CVP 21. Generally, the variator 40 may include a variety of devices capable of summing the mechanical inputs from the engine 20 and the CVP 21 for a combined mechanical output to the output shaft 22 for split-path power transmission. In certain embodiments, as depicted in FIG. 2, the variator 40 may be configured as a summing planetary gear set (e.g., a double planetary gear set). It will be understood, however, that other configurations may be possible.

The transmission 25 may be configured as a multi-mode transmission and may provide selective shifting between the different modes. For example, the transmission 25 may provide one or more split-path power transmission modes. In each of these modes, power from the engine 20 and the CVP 21 may be combined or summed (e.g., by the variator 40), and the resulting combined/summed power may be delivered to the output shaft 22. In one split-path mode, the output shaft 22 may be rotated within a first speed range, and in another split-path mode, the output shaft 22 may be rotated within a second speed range. The second speed range may be higher than the first speed range in some embodiments. There may be additional split-path modes providing other speed ranges for the output shaft 22 as well.

Additionally, the transmission 25 may provide one or more CVP-only modes. For example, in some embodiments, the transmission 25 may, in a sense, disconnect the engine 20 from the output shaft 22 and instead deliver CVP power from the CVP 21 to the output shaft 22. In some embodiments, the speed range for the output shaft 22 during a CVP-only mode may be relatively low. For example, the transmission 25 may provide a CVP-only mode at which torque is maintained at the output shaft 22 while the output shaft 22 remains stationary (i.e., angular velocity of zero). This may be referred to as "powered zero". The output shaft 22 may be driven at relatively low speeds (i.e., "creeper speeds") as well in this CVP-only mode.

To control transition between the various transmission modes, the transmission 25 may include a control set 55 with a plurality of selective transmission components 56. The selective transmission components 56 may include wet clutches, dry clutches, dog collar clutches, brakes, or other similar components that may selectively move between an engaged position and a disengaged position. As an example, the selective transmission components 56 may include a first clutch 54, a second clutch 64, a third clutch 80, a fourth clutch 112, and a fifth clutch 118.

More specifically, the selective transmission components 56 may include a first member and a second member that may engage each other (i.e., fixedly attach together for rotation as a unit) and, alternatively, disengage from each other (i.e., detach to allow relative rotation between the two). Although not shown, the control set 55 may be connected to a known control system (e.g., a computerized actuator control system) for controlling actuation of the individual transmission components 56.

As will be discussed in detail, the transmission 25 may provide effective power transmission across a number of modes such that the powertrain 12 is highly efficient. As a result, the transmission 25 may enhance fuel efficiency of the work vehicle 10. Also, the transmission 25 may be relatively compact and may have a relatively simple design and assembly. For example, the transmission 25 may include several components that are positioned coaxially, such that the components are substantially centered about a common axis of rotation. Specifically, in some embodiments, the variator 40, the output shaft 22 and at least two of the selective transmission components 56 may be coaxial in some embodiments.

In some embodiments, the engine 20 may include an engine shaft 36 that is supported for rotation about a first axis 38. A first gear 42 may be fixed for rotation on the shaft 36 at an end opposite the engine 20. The first gear 42 may be enmeshed with a second gear 44. The second gear 44 may be fixed for rotation on a first CVM shaft 46. The first CVM shaft 46 may be connected to the first CVM 30. The first CVM shaft 46 may be considered an input shaft for delivering mechanical power to the first CVM 30. The first CVM shaft 46 may also be parallel and spaced at a distance from the first axis 38.

The second CVM 34 may also include a second CVM shaft 48. The second CVM shaft 48 may be considered the output shaft of the second CVM 34 and may be driven in rotation about an axis that is spaced apart from and parallel to the first axis 38. A third gear 50 may be fixed for rotation on the second CVM shaft 48. The third gear 50 may be enmeshed with a fourth gear 52.

The transmission 25 may further include a first clutch 54 of the control set 55. The first clutch 54 may be referred to as a "creeper clutch" in some embodiments. The first clutch 54 may include at least one first member 58 (e.g., first clutch plate(s)). The first member 58 may be fixed for rotation with the fourth gear 52 about the first axis 38. The first clutch 54 may also include at least one second member 60 (e.g., second clutch plate(s)). The second member 60 may be fixed for rotation on an end of a shaft 62. The shaft 62 may be hollow and may surround and receive the engine shaft 36 and the shaft 62 may be supported for rotation about the first axis 38. As such, the shaft 62 may be coaxial with the engine shaft 36.

Furthermore, the first clutch 54 may be configured to move between an engaged position and a disengaged position. For example, the first member 58 and the second member 60 fix together in the engaged position for rotation as a unit about the first axis 38. The first member 58 and the second member 60 disconnect to allow relative rotation in the disengaged position.

The transmission 25 may additionally include a second clutch 64 of the control set 55. The second clutch 64 may be referred to as a "reverse clutch" in some embodiments. Like the first clutch 54, the second clutch 64 may include at least one first member 66 and at least one second member 68. The second member 68 may be fixed on an end of the shaft 62 opposite the second member 60. The first member 66 may be fixed to a fifth gear 70 for rotation as a unit about the first axis 38. The first member 66 and the second member of the second clutch 64 may engage to allow power transmission between the shaft 62 and the fifth gear 70. The first and second members 66, 68 may disengage to cut off this power flow.

A sixth gear 72 may be fixed to the shaft 62. The sixth gear 72 may be interposed on the shaft 62 between the first clutch 54 and the second clutch 64. The sixth gear 72 may be enmeshed with an idler gear 74, which is enmeshed with a seventh gear 76. The seventh gear 76 is supported for rotation about a second axis 78. In some embodiments, the second axis 78 may be parallel and spaced apart at a distance from the first axis 38.

Furthermore, the transmission 25 may include a third clutch 80 of the control set 55. The third clutch 80 may be referred to as a "forward clutch" in some embodiments. Like the above-described clutches, the third clutch 80 may include at least one first member 82 and at least one second member 84. The first member 82 may be fixed to the seventh gear 76 for rotation about the second axis 78. The second member 84 may be fixed to an end of a hollow shaft 86. The first member 82 and the second member 84 of the third clutch 80 may engage to allow power transmission between the shaft 86 and the seventh gear 76. The first and second members 82, 84 may disengage to cut off this power transmission path.

Additionally, an eighth gear 88 may be fixed on the hollow shaft 86 on an end opposite the third clutch 80. The eighth gear 88 may be enmeshed with the fifth gear 70.

The transmission 25 may further include a shaft 90 (i.e., a center shaft). The shaft 90 may be centered on the second axis 78 and supported for rotation about the second axis 78. An end portion of the shaft 90 may be received within the shaft 86 and may be coaxial therewith. The first member 82 of the third clutch 80 may be fixed to the shaft 90.

Furthermore, the transmission 25 may include a hollow shaft 92. The hollow shaft 92 may receive another portion of the shaft 90 and may be coaxial therewith. A ninth gear 94 may be fixed on one end of the hollow shaft 92. The ninth gear 94 may be enmeshed with the fourth gear 52.

The transmission 25 may further include the variator 40, which may be substantially centered on and supported for rotation about the second axis 78. The variator 40 may comprise a planetary gearset in some embodiments. In the illustrated embodiment, the variator 40 may comprise a double planetary gearset. However, it will be appreciated that the variator 40 may vary from the illustrated embodiment without departing from the scope of the present disclosure. Furthermore, it will be appreciated that the variator 40 may include a plurality of variator members, some of which may serve as power inputs and some of which may serve as power outputs, depending on the current mode of the transmission 25.

In the illustrated embodiment, for example, the variator 40 may include a first planetary gearset 96 (a low planetary gearset) that includes a first sun gear 98, a first ring gear 100, and a plurality of planet gears 102 with a respective first carrier 104. The first sun gear 98 may be fixed to the shaft 92 for rotation about the second axis 78. The first planet gears 102 may enmeshed with and disposed between the first sun gear 98 and the first ring gear 100. The first planet gears 102 and the first carrier 104 may be configured to rotate as a unit about the second axis 78. Likewise, the first ring gear 100 may be centered on and supported for rotation about the second axis 78.

In addition, the variator 40 may include a first output member 101. The first output member 101 may be fixed to the first carrier 104 for rotation therewith about the second axis 78. At least a portion of the first output member 101 may be hollow and may receive the output shaft 22.

Moreover, the variator 40 may include a second planetary gearset 106 (a high planetary gearset) that includes a second sun gear 108, a second ring gear 110, and a plurality of second planet gears 113 with an associated second carrier 115. The second sun gear 108 may be fixed to the shaft 92 for rotation about the second axis 78. In some embodiments, the first sun gear 98 may be disposed on the shaft 92 between the second sun gear 108 and the ninth gear 94. The second planet gears 113 may be enmeshed with and disposed between the second sun gear 108 and the second ring gear 110. The second planet gears 113 and the second carrier 115 may be configured to rotate as a unit about the second axis 78. Likewise, the second ring gear 110 may be centered on and supported for rotation about the second axis 78. In some embodiments, the second carrier 115 may be fixed to an end of the shaft 90. The opposite portion of the second carrier 115 may be fixed to the first ring gear 100.

The variator 40 may also include a second output member 111. The second output member 111 may be fixed to the second ring gear 110 for rotation therewith about the second axis 78. At least a portion of the second output member 111 may be hollow and may receive the output shaft 22.

Furthermore, the transmission 25 may include a fourth clutch 112 of the control set 55. The fourth clutch 112 may be referred to as a "first range clutch" in some embodiments. Like the above-described clutches, the fourth clutch 112 may include at least one first member 114 and at least one second member 116. The first member 114 may be fixed to the output shaft 22 for rotation about the second axis 78. The second member 116 may be fixed to the first variator output member 101. The first member 114 and the second member 116 of the fourth clutch 112 may engage to allow power transmission from the first output member 101 to the output shaft 22. The first and second members 114, 116 may disengage to cut off this power transmission path.

Additionally, the transmission 25 may include the fifth clutch 118 of the control set 55. The fifth clutch 118 may be referred to as a "second range clutch" in some embodiments. Like the above-described clutches, the fifth clutch 118 may include at least one first member 120 and at least one second member 122. The first member 120 may be fixed to the output shaft 22 for rotation about the second axis 78. The second member 122 may be fixed to the second variator output member 111. The first member 120 and the second member 122 of the fifth clutch 118 may engage to allow power transmission from the second output member 111 to the output shaft 22. The first and second members 120, 122 may disengage to cut off this power transmission path.

In some embodiments, the control set 55 of the transmission 25 may provide selection between at least three modes: 1) a CVP-only creeper mode (including powered-zero); 2) a lower speed split-path field mode; and 3) a higher speed split-path field mode. Each of these may be forward modes for drivingly rotating the output shaft 22 in a forward direction (i.e., for moving the work vehicle 10 forward). The transmission 25 may also provide one or more reverse modes for drivingly rotating the output shaft 22 in a reverse (opposite direction) (i.e., for moving the work vehicle 10 in reverse).

Specifically, the transmission 25 may provide the CVP-only creeper mode when the first and fourth clutches 54, 112 are engaged and the second, third, and fifth clutches 64, 80, 118 are disengaged. Accordingly, engine power from the engine 20 may transmit from the shaft 36 to the gear 42 to the gear 44, and to the first CVM 30. The first CVM 30 may convert this mechanical input to electrical output for powering the second CVM 34. Meanwhile, the second CVM 34 may drive the shaft 48 and power may transmit from the gear 50, to the gear 52, through the first clutch 54, to the gear 94, to the shaft 92, to the first sun gear 98. In addition, CVM power may simultaneously transmit along the shaft 62, to the gear 72, through the idler gear 74 to the gear 76, through the first member 82 to the shaft 90, to the carrier 115, to the first ring gear 100. Accordingly, CVM power from the second CVM 34 may re-combine at the first planet gears 102 to drive the first carrier 104 and the first output member 101. The first output member 101 may output this power through the fourth clutch 112 to the output shaft 22. Thus, this mode of the transmission 25 provides power from the CVP 21 to the output shaft 22 and also disconnects the engine 20 from the output shaft 22 (i.e., eliminates the direct mechanical connection of the engine 20 such that the engine 20 is merely powering the generator of the first CVM 30.

The transmission 25 may provide a first split-path forward mode when the third and fourth clutches 80, 112 are engaged and the first, second, and fifth clutches 54, 64, 118 are disengaged. It is noted that the shift from the CVP-only mode may be substantially seamless as the first clutch 54 may disengage and the third clutch 80 engages. In this mode, engine power from the shaft 36 may transfer to the gear 70, to the gear 88, to the shaft 86, through the third clutch 80 to the shaft 90 to the carrier 115, to drivingly rotate the first ring gear 100. Engine power may also drive the gear 42, and power may transfer to the gear 44, to the shaft 46 to drive the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 92 to drive the first sun gear 98. The variator 40 may sum or combine the engine power (at the first ring gear 100) and the CVP power (at the first sun gear 98) and output combined power via the first planet gears 102 and associated carrier 104 to drivingly rotate the first output member 101. The first output member 101 may output this power through the fourth clutch 112 to the output shaft 22.

Also, the transmission 25 may provide a second split-path forward mode when the third and fifth clutches 80, 118 are engaged and the first, second, and fourth clutches 54, 64, 112 are disengaged. This mode may provide a higher range of output speeds for the output shaft 22 as compared to the first split-path forward mode described above. It is noted that the shift from the first split-path forward mode to this second split-path forward mode may be substantially seamless as the fourth clutch 112 may disengage and the fifth clutch 118 engages. In this mode, engine power from the shaft 36 may transfer to the gear 70, to the gear 88, to the shaft 86, through the third clutch 80 to the shaft 90 to the carrier 115, to drivingly rotate the second planet gears 113. Engine power may also drive the gear 42, and power may transfer to the gear 44, to the shaft 46 to drive the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 92 to drive the second sun gear 108. The variator 40 may sum or combine the engine power (at the second planet gears 113)

and the CVP power (at the second sun gear 108) and output combined power via the second ring gear 110 to drivingly rotate the second output member 111. The second output member 111 may output this power through the fifth clutch 118 to the output shaft 22.

Furthermore, the transmission 25 may provide a first split-path reverse mode when the second clutch 64 and the fourth clutch 112 are engaged and the first, third, and fifth clutches 54, 80, 118 are disengaged. In this mode, engine power from the shaft 36 may transfer through the second clutch 64, to the shaft 62, to the gear 72, through the idler gear 74, to the gear 76, to the shaft 90, to the carrier 115, to drivingly rotate the first ring gear 100. Engine power may also drive the gear 42, and power may transfer to the gear 44, to the shaft 46 to supply mechanical power to the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 92 to drive the first sun gear 98. The variator 40 may sum or combine the engine power (at the first ring gear 100) and the CVP power (at the first sun gear 98) and output combined power via the first planet gears 102 and associated carrier 104 to drivingly rotate the first output member 101. The first output member 101 may output this power through the fourth clutch 112 to the output shaft 22. The output shaft 22 may be rotated in reverse (i.e., opposite the direction of the first split-path forward mode discussed above).

Moreover, the transmission 25 may provide a second split-path reverse mode when the second clutch 64 and the fifth clutch 118 are engaged and the first, third, and fourth clutches 54, 80, 112 are disengaged. In this mode, engine power from the shaft 36 may transfer through the second clutch 64, to the shaft 62, to the gear 72, through the idler gear 74, to the gear 76, to the shaft 90, to the carrier 115, to drivingly rotate the second planet gears 113. Engine power may also drive the gear 42, and power may transfer to the gear 44, to the shaft 46 to supply mechanical power to the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 92 to drive the second sun gear 108. The variator 40 may sum or combine the engine power (at the second planet gears 113) and the CVP power (at the second sun gear 108) and output combined power via the second ring gear 110 to drivingly rotate the second output member 111. The second output member 111 may output this power through the fifth clutch 118 to the output shaft 22. The output shaft 22 may be rotated in reverse (i.e., opposite the direction of the second split-path forward mode discussed above).

Thus, the transmission 25 provides a plurality of modes that may be useful in different conditions. The operator may select between these different modes and/or the transmission 25 may automatically shift between these modes to maintain high operating efficiency.

Also, the transmission 25 may be constructed and arranged in a well-organized and compact manner. For example, the variator 40 may be substantially coaxial with the fourth clutch 112 and the fifth clutch 118. In other words, the fourth and fifth clutches 112, 118 may be substantially centered about the same axis of rotation (i.e., the axis 78) with the variator 40. The fourth and fifth clutches 112, 118 are both connected to the output members of the variator 40 (i.e., the first output member 101 in the case of the fourth clutch 112 and the second output member 111 in the case of the fifth clutch 118). Also, both the fourth and fifth clutches 112, 118 are operably connected to the output shaft 22. The output shaft 22 is similarly coaxial with the variator 40, the fourth clutch 112, and the fifth clutch 118. In addition, the third clutch 80 is similarly coaxial with the output shaft 22, the variator 40, the fourth clutch 112, and the fifth clutch 118.

Furthermore, the transmission 25 may be compact on the input side of the variator 40 as well. For example, the first clutch 54 and the second clutch 64 may be coaxial about the axis 38. In some embodiments, the member 60 of the first clutch 54 and the member 68 of the second clutch 64 may be fixed together via the hollow shaft 62, which receives the engine shaft 36. The first clutch 54 and second clutch 64 may be coaxial with the engine shaft 36 as well.

Generally, clutches and/or other transmission members may be quite bulky, difficult to assemble, and/or to access for repair. However, the coaxial arrangement disclosed herein allows the transmission 25 to be relatively compact overall. The transmission 25 may also include relatively few parts because of this arrangement.

Figure 3:
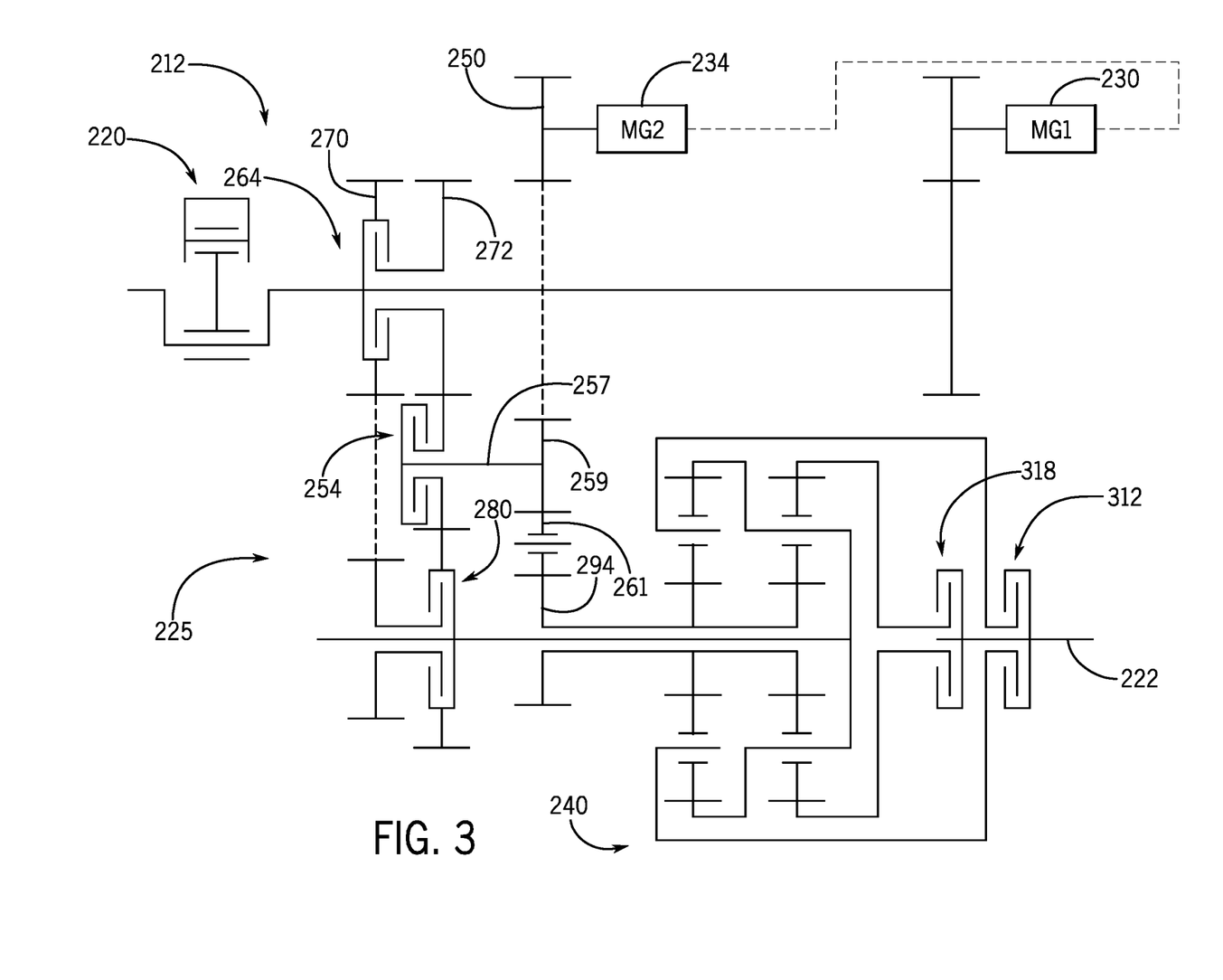
FIG. 3 is a schematic view of the CVT of the present disclosure according to another example embodiment.

Referring now to FIG. 3, the powertrain 212 will be discussed according to additional embodiments of the present disclosure. Components of FIG. 3 that correspond to those of the powertrain 12 of FIG. 2 will be identified with corresponding reference numbers increased by 200.

The powertrain 212 may include the engine 220, the first CVM 230, the second CVM 234, and the variator 240. Similar to the embodiment of FIG. 2, the third clutch 280, the fourth clutch 312, the fifth clutch 318, the variator 240, and the output shaft 222 may be substantially coaxial.

The first clutch 254 may have a different position as compared to the embodiment of FIG. 2. As shown, the first clutch 254 may be interposed between the second clutch 264 and the third clutch 280. A member of the first clutch 254 may be fixed to and supported for rotation with an intermediate shaft 257. An intermediate gear 259 may also be fixed to the intermediate shaft 257. The intermediate gear 259 may engage both the gear 250 and an idler gear 261. The idler gear 261 may, in turn, engage the gear 294.

The transmission 225 may provide the modes discussed above with respect to the embodiment of FIG. 2. Specifically, the first clutch 254 and the fourth clutch 312 may be engaged to provide a CVP-only powered-zero and creeper mode. Also, the third clutch 280 and the fourth clutch 312 may be engaged to provide a split-path, low-speed, forward field mode. Likewise, the third clutch 280 and the fifth clutch 318 may be engaged to provide a split-path, hi-speed, forward field mode. Moreover, the second clutch 264 and the fourth clutch 312 may be engaged to provide a split-path, low-speed reverse field mode. Finally, the second clutch 264 and the fifth clutch 318 may be engaged to provide a split-path, hi-speed, reverse field mode.

Thus, the transmission 225 of FIG. 3 may be useful and may provide high operating efficiency in a number of different operating conditions. Also, the transmission 225 may be relatively compact in size.

Figure 4:
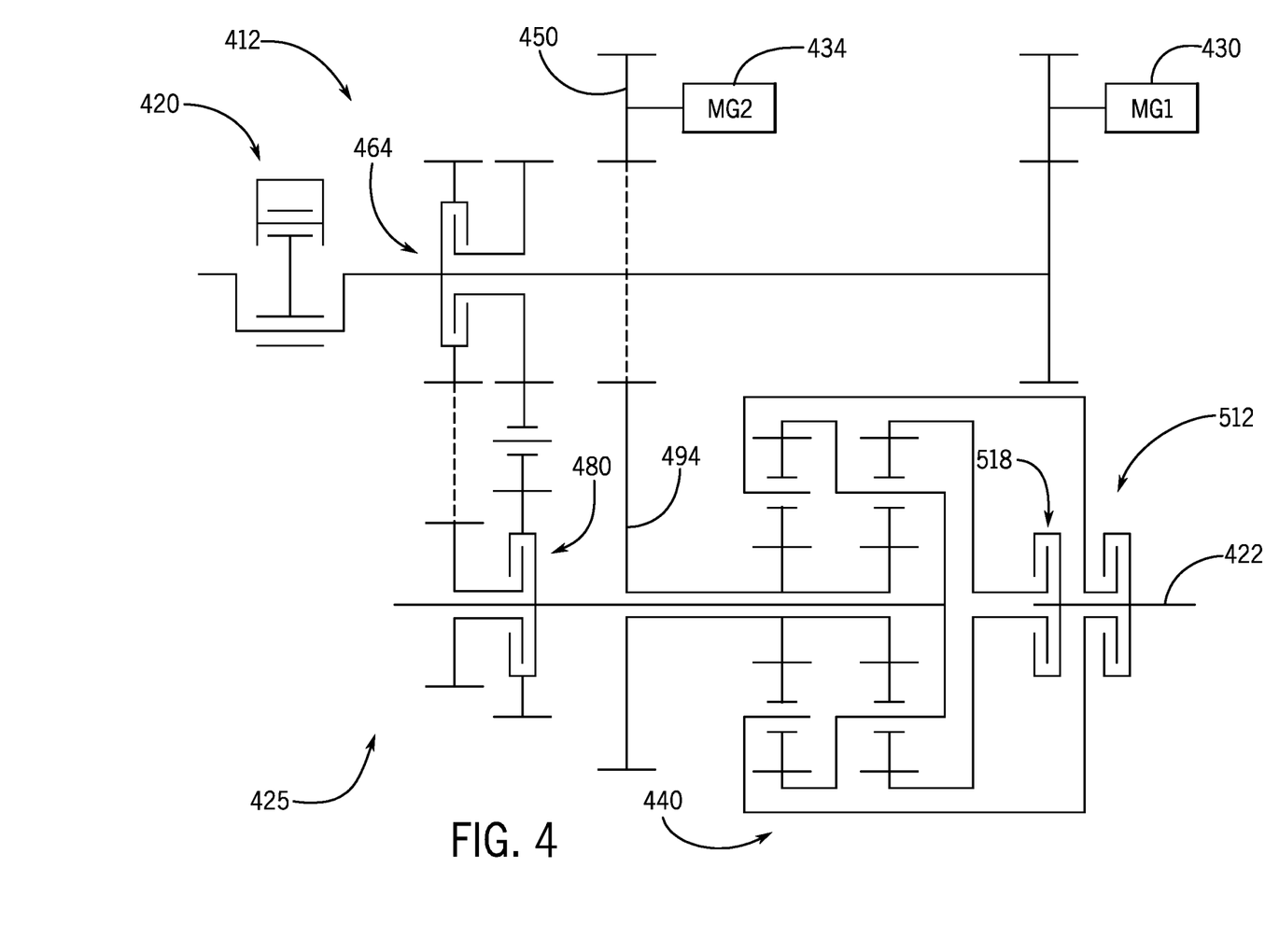
FIG. 4 is a schematic view of the CVT of the present disclosure according to another example embodiment.

Referring now to FIG. 4, the powertrain 412 will be discussed according to additional embodiments of the present disclosure. Components of FIG. 4 that correspond to those of the powertrain 12 of FIG. 2 will be identified with corresponding reference numbers increased by 400.

The powertrain 412 may include the engine 420, the first CVM 430, the second CVM 434, and the variator 440. Similar to the embodiment of FIGS. 2 and 3, the third clutch 480, the fourth clutch 512, the fifth clutch 518, the variator 440, and the output shaft 422 may be substantially coaxial.

The transmission 425 may also include the second clutch 464, similar to FIG. 2. However, the gear 450 of the second CVM 434 may be continuously engaged with the gear 494 (instead of including a clutch therebetween like the embodiment of FIG. 2).

Accordingly, the transmission 425 may provide a first (low speed), split-path, forward field mode by engaging the third clutch 480 and the fourth clutch 512. Also, the transmission 425 may provide a second (high speed), split-path, forward field mode by engaging the third clutch 480 and the fifth clutch 518. Moreover, the transmission 425 may provide a first (low speed), split-path, reverse field mode by engaging the second clutch 464 and the fourth clutch 512. Finally, the transmission 425 may provide a second (high speed), split-path reverse field mode by engaging the second clutch 464 and the fifth clutch 518.

Figure 5:
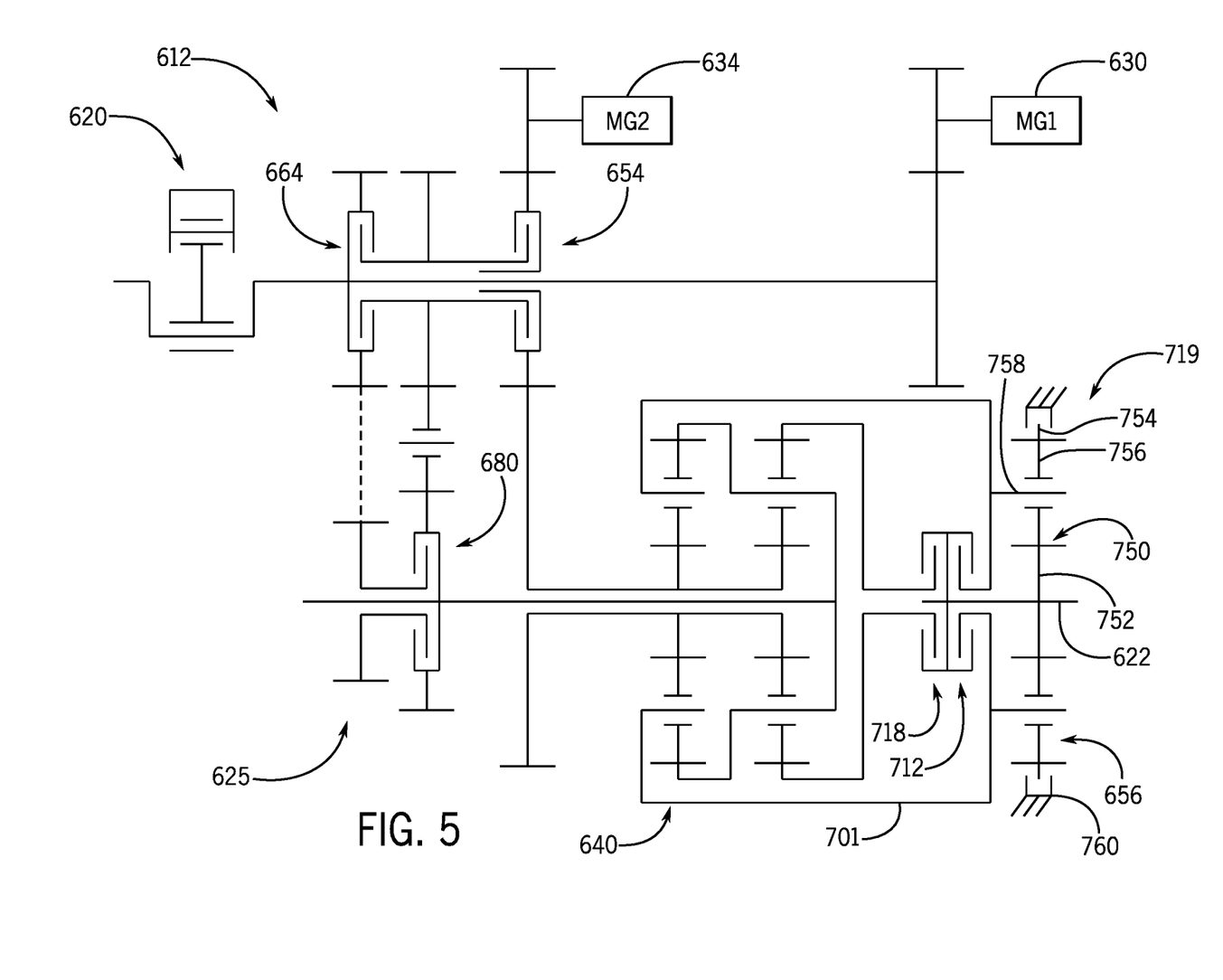
FIG. 5 is a schematic view of the CVT of the present disclosure according to another example embodiment.

Referring now to FIG. 5, the powertrain 612 will be discussed according to additional embodiments of the present disclosure. Components of FIG. 5 that correspond to those of the powertrain 12 of FIG. 2 will be identified with corresponding reference numbers increased by 600.

The powertrain 612 may include the engine 620, the first CVM 630, the second CVM 634, and the variator 640. The powertrain 612 may also include the first clutch 654, the second clutch 664, the third clutch 680, the fourth clutch 712, and the fifth clutch 718, which are arranged substantially the same as in FIG. 2. However, the powertrain 612 may additionally include another selective transmission component 656 that may be selectively engaged and disengaged to provide an additional mode. For example, the transmission component 656 may include a planetary gearset 750 having a sun gear 752, a ring gear 754, and a plurality of planet gears 756 with an associated carrier 758. The transmission component 656 may additionally include a brake 760 that may selectively engage (brake) the ring gear 754 and, alternatively, disengage (unbrake) the ring gear 754.

The carrier 758 may be fixed to the output member 701 of the variator 640. The sun gear 752 may be fixedly mounted to the output shaft 622 and may be centered thereon. Likewise, the planet gears 756, the carrier 758, and the ring gear 754 may be substantially coaxial with the output shaft 622. Accordingly, in some embodiments, the transmission component 656 may be substantially coaxial with the variator 640, the output shaft 622, the third clutch 680, the fourth clutch 712, and the fifth clutch 718.

The transmission 625 may provide the same modes as the embodiment of FIG. 2. Specifically, the transmission 625 may provide: 1) a CVP-only mode powered-zero and creeper mode; 2) a first, forward, split-path field mode; 3) a second, forward split-path field mode; 4) a first, reverse, split-path field mode; and 5) a second, reverse split-path field mode. The transmission 625 may provide at least one additional split-path field mode. Specifically, by engaging the third clutch 680 and by braking the brake 760 against the ring gear 754, the transmission 625 may provide a third, forward split-path field mode. This third mode may provide a range of ground speeds that are greater than those of the first and second forward field modes. Likewise, by engaging the second clutch 664 and by braking the brake 760 against the ring gear 754, the transmission 625 may provide a third, reverse split-path field mode. This third mode may provide a range of ground speeds that are greater than those of the first and second reverse field modes.

Figure 6:
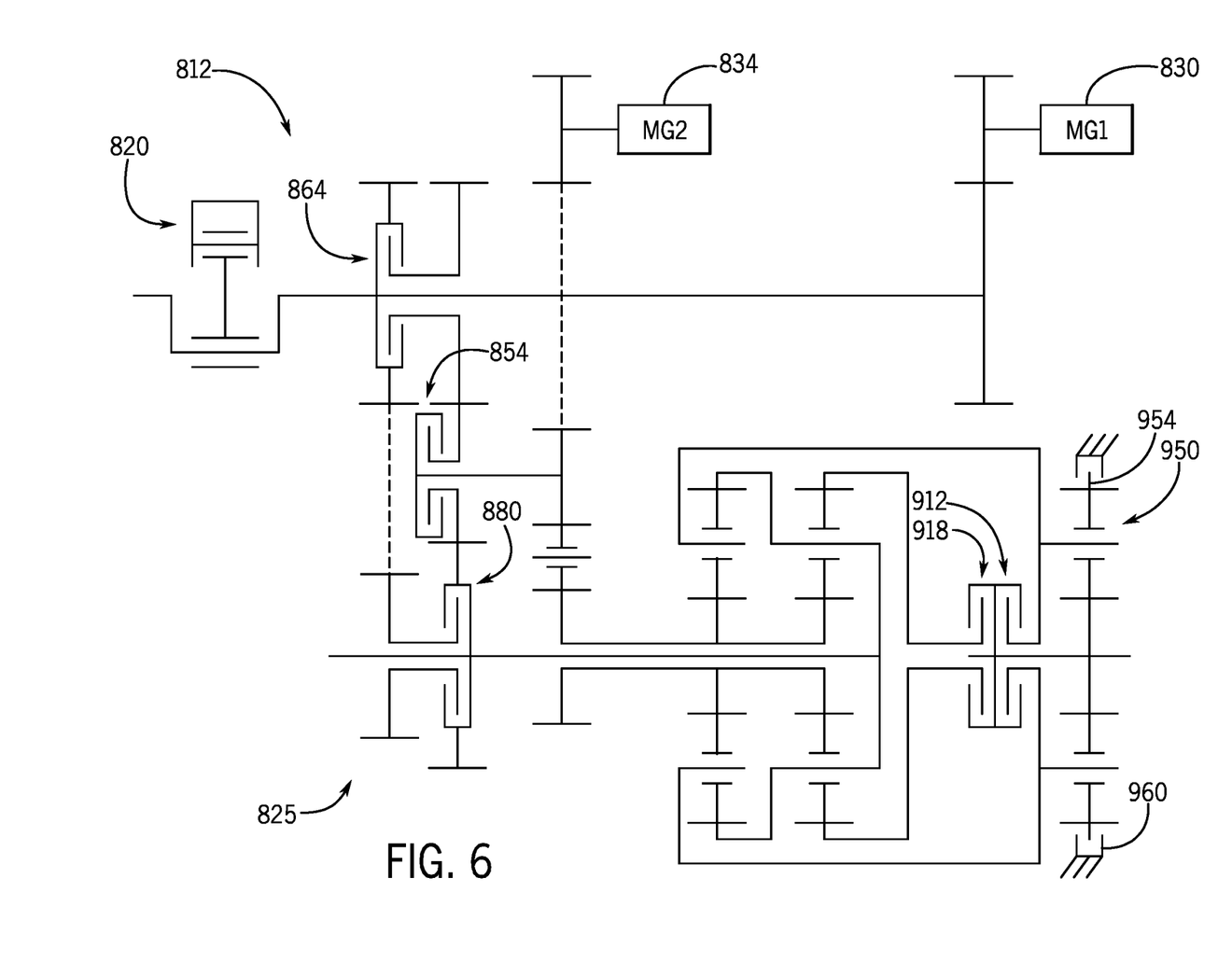
FIG. 6 is a schematic view of the CVT of the present disclosure according to another example embodiment.

Referring now to FIG. 6, the powertrain 812 will be discussed according to additional embodiments of the present disclosure. Components of FIG. 6 that correspond to those of the powertrain 12 of FIG. 2 will be identified with corresponding reference numbers increased by 800.

This embodiment may be substantially similar to the powertrain 212 of FIG. 3 and may additionally include the planetary gearset 950, similar to FIG. 5. Accordingly, the transmission 825 may provide the same modes as those provided by the transmission 225 of FIG. 3. Additionally, the transmission 825 may provide a third, split-path forward field mode by engaging the third clutch 880 and by engaging the brake 960 with the ring gear 954. Likewise, the transmission 825 may provide a third, split-path reverse field mode by engaging the second clutch 864 and by engaging the brake 960 with the ring gear 954.

Figure 7:
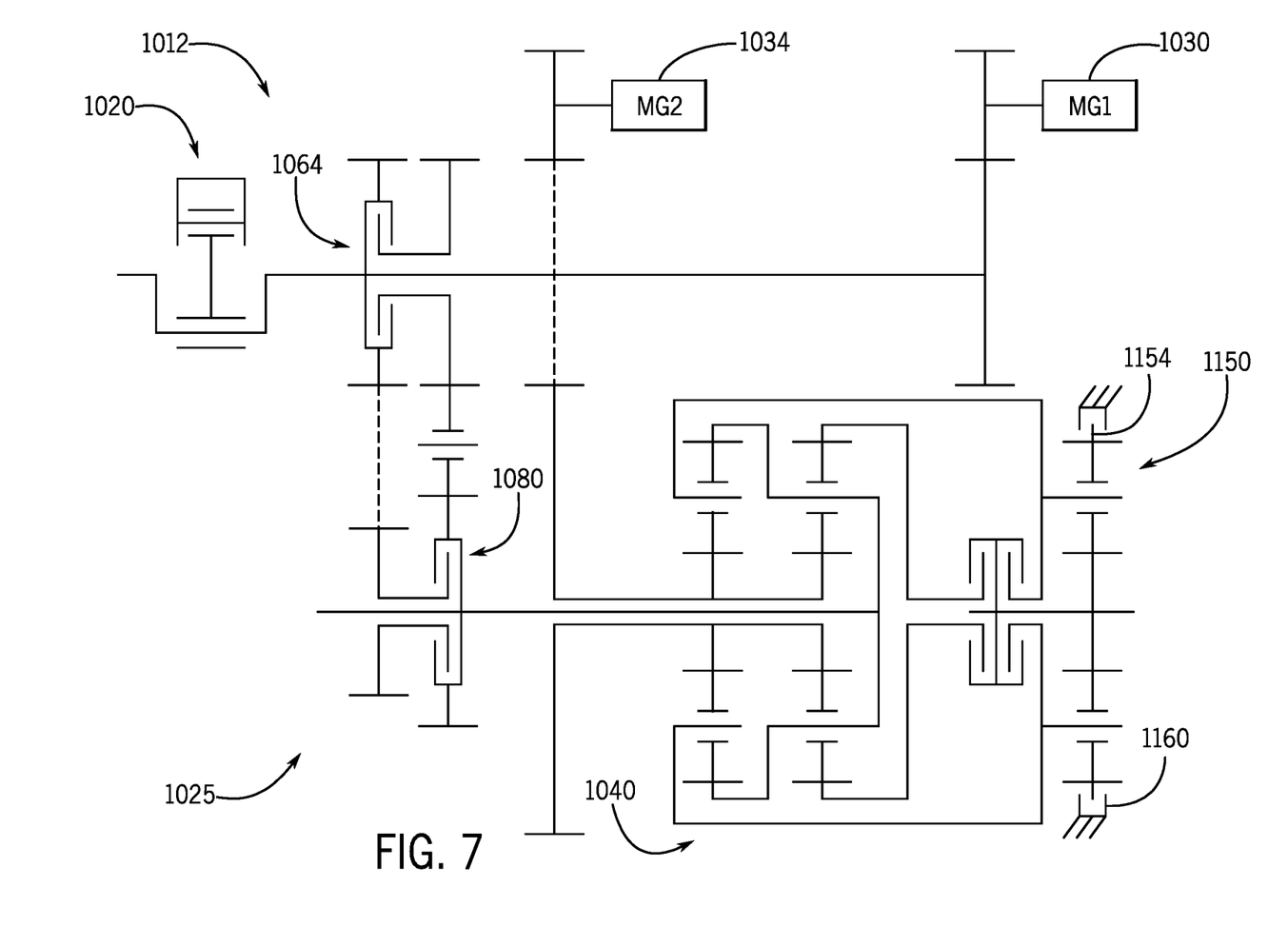
FIG. 7 is a schematic view of the CVT of the present disclosure according to another example embodiment.

Referring now to FIG. 7, the powertrain 1012 will be discussed according to additional embodiments of the present disclosure. Components of FIG. 7 that correspond to those of the powertrain 12 of FIG. 2 will be identified with corresponding reference numbers increased by 1000.

This embodiment may be substantially similar to the powertrain 412 of FIG. 4 and may additionally include the planetary gearset 1150, similar to FIG. 5. Accordingly, the transmission 1025 may provide the same modes as those provided by the transmission 425 of FIG. 4. Additionally, the transmission 1025 may provide a third, split-path forward field mode by engaging the third clutch 1080 and by engaging the brake 1160 with the ring gear 1154. Likewise, the transmission 1025 may provide a third, split-path reverse field mode by engaging the second clutch 1064 and by engaging the brake 1160 with the ring gear 954.

Also, the following examples are provided, which are numbered for easier reference.

1. A powertrain comprising: an engine; a continuously variable power source (CVP); an output shaft; and a transmission configured to provide selection between one of a plurality of transmission modes in which the transmission transmits power from at least one of the engine and the CVP to the output shaft; the transmission including a variator that is operably connected to the engine and the CVP, the variator including at least one variator output member configured to rotate under power from at least one of the engine and the CVP; the transmission including a first transmission component and a second transmission component, both having an engaged position and a disengaged position; the plurality of transmission modes including a first transmission mode in which the second transmission component is in the disengaged position and the first transmission component is in the engaged position to transmit power from the at least one variator output member toward the output shaft to drivingly rotate the output shaft within a first speed range; the plurality of transmission modes including a second transmission mode in which the first transmission component is in the disengaged position and the second transmission component is in the engaged position to transmit power from the at least one variator output member toward the output shaft to drivingly rotate the output shaft within a second speed range, the second speed range being higher than the first speed range; and the first transmission component and the second transmission component being substantially coaxial with the at least one variator output member.

2. The powertrain of example 1, wherein the output shaft is substantially coaxial with the at least one variator output member, the first transmission component, and the second transmission component.

3. The powertrain of example 2, wherein at least one of the first and second transmission components includes a first member and a second member; wherein the first member is fixedly attached to the at least one variator output member;

wherein the second member is fixedly attached to the output shaft; and wherein the first member and the second member are attached in the engaged position and are detached in the disengaged position.

4. The powertrain of example 1, wherein the variator, in the first transmission mode and the second transmission mode, is configured to provide combined power from the engine and the CVP to the at least one variator output member; wherein the plurality of transmission modes includes a third transmission mode; wherein, in the third transmission mode, the second transmission component is in the disengaged position and the first transmission component is in the engaged position to transmit power from the at least one variator output member toward the output shaft to drivingly rotate the output shaft within a third speed range; wherein the third speed range is lower than the first speed range; wherein, in the third transmission mode, the variator is configured to provide CVP power from the CVP to the at least one variator output member; and wherein, in the third transmission mode, the transmission disconnects the engine from the variator.

5. The powertrain of example 1, wherein the variator, in at least one of the first and second transmission modes, is configured to provide CVP power from the CVP to the at least one variator output member; and wherein the transmission, in the at least one of the first and second transmission modes, is configured to disconnect the engine from the variator.

6. The powertrain of example 1, further comprising a third transmission component having an engaged position and a disengaged position; wherein the plurality of transmission modes includes a third transmission mode in which the first transmission component and the second transmission component are in the disengaged position and the third transmission component is in the engaged position to transfer power from the at least one variator output member toward the output shaft to drivingly rotate the output shaft within a third speed range, the third speed range being higher than the second speed range; and wherein the third transmission component is substantially coaxial with the at least one variator output member.

7. The powertrain of example 6, wherein the third transmission component includes a brake and a planetary gearset with a plurality of gears; and wherein the brake, in the engaged position of the third transmission component, is configured to brake one of the plurality of gears.

8. The powertrain of example 1, further comprising a forward transmission component and a reverse transmission component, each having an engaged position and a disengaged position; wherein the plurality of transmission modes includes a first forward transmission mode, a second forward transmission mode, and a reverse transmission mode; wherein, in the first forward transmission mode, the reverse transmission component and the second transmission component are in the disengaged position and the forward transmission component and the first transmission component are in the engaged position, the first transmission component configured to transmit power from the at least one variator output member toward the output shaft to drivingly rotate the output shaft within the first speed range in a first rotational direction; wherein, in the second forward transmission mode, the reverse transmission component and the first transmission component are in the disengaged position and the forward transmission component and the second transmission component are in the engaged position, the second transmission component configured to transmit power from the at least one variator output member toward the output shaft to drivingly rotate the output shaft within the second speed range in the first rotational direction; and wherein, in the reverse transmission mode, the forward transmission component and the second transmission component are in the disengaged position and the reverse transmission component and the first transmission component are in the engaged position, the first transmission component configured to transmit power from the at least one variator output member toward the output shaft to drivingly rotate the output shaft in a second rotational direction that is opposite the first rotational direction.

9. The powertrain of example 1, wherein the CVP includes a first continuously variable machine (CVM) and a second CVM; wherein the plurality of transmission modes includes at least one transmission mode in which: the engine provides power to the first CVM to generate power that is supplied to the second CVM; the second CVM provides power to a first input member of the variator; the second CVM provides power to a second input member of the variator; and the variator recombines power from the first and second input members that is output to the at least one variator output member.

10. The powertrain of example 1, further comprising a third transmission component having an engaged position and a disengaged position; wherein the plurality of transmission modes includes at least one transmission mode in which the third transmission component is in the engaged position to transmit power from at least one of the engine and the CVP to the variator; and wherein the first transmission component, the second transmission component, and the third transmission component are substantially coaxial with the at least one variator output member.

11. A powertrain comprising: an engine with an engine shaft; an output shaft that is substantially parallel to and spaced apart at a distance from the engine shaft; a continuously variable power source (CVP); and a transmission configured to provide selection between one of a plurality of transmission modes in which the transmission transmits power from at least one of the engine and the CVP to the output shaft, the transmission including: a variator that is operably connected to the engine and the CVP; and a first transmission component and a second transmission component, both configured to engage for power transmission from the variator to the output shaft, both configured to disengage to disconnect the variator from the output shaft; the plurality of transmission modes including a first transmission mode in which the second transmission component is disengaged and the first transmission component is engaged to transmit power from the variator toward the output shaft to drivingly rotate the output shaft; the plurality of transmission modes including a second transmission mode in which the first transmission component is disengaged and the second transmission component is engaged to transmit power from the variator toward the output shaft to drivingly rotate the output shaft; and the variator, the first transmission component, and the second transmission component being substantially coaxial with the output shaft.

12. The powertrain of example 11, wherein at least one of the first and second transmission components includes a first member and a second member; wherein the first member is fixedly attached to a variator output member; wherein the second member is fixedly attached to the output shaft; and wherein the first member and the second member are attached in the engaged position and are detached in the disengaged position.

13. The powertrain of example 12, further comprising a third transmission component having an engaged position and a disengaged position; wherein the plurality of transmission modes includes at least one transmission mode in which the third transmission component is in the engaged position to transmit power from at least one of the engine and the CVP to the variator; and wherein the variator, the first transmission component, the second transmission component, and the third transmission component are substantially coaxial with the output shaft.

14. The powertrain of example 11, wherein the variator, in the first transmission mode and the second transmission mode, is configured to combine power from the engine and the CVP and is configured to output the combined power; wherein the plurality of transmission modes includes a third transmission mode; wherein, in the third transmission mode, the second transmission component is in the disengaged position and the first transmission component is in the engaged position to transmit power from the variator toward the output shaft to drivingly rotate the output shaft; wherein, in the third transmission mode, the variator is configured to provide CVP power from the CVP to the first transmission component; and wherein, in the third transmission mode, the transmission disconnects the engine from the variator.

15. The powertrain of example 11, further comprising a third transmission component having an engaged position and a disengaged position; wherein the plurality of transmission modes includes a third transmission mode in which the first transmission component and the second transmission component are disengaged and the third transmission component is engaged to transfer power from the variator toward the output shaft to drivingly rotate the output shaft; and wherein the third transmission component is substantially coaxial with the output shaft.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A powertrain comprising:
    an engine;
    a continuously variable power source (CVP) providing CVP power;
    an output shaft; and
    a transmission configured to transmit the CVP power or combined power from the engine and the CVP to the output shaft, the transmission including:
        a variator that is operably connected to the engine and the CVP, the variator including a first output member and a second output member, each of the first and second output members configured to rotate selectively under the combined power;
        a forward transmission component, a reverse transmission component, and a creeper transmission component, each having an engaged position and a disengaged position; and
        a first speed transmission component and a second speed transmission component, each having an engaged position and a disengaged position;
    wherein, in a first forward transmission mode, the reverse transmission component and the second speed transmission component are each in the disengaged position and the forward transmission component and the first speed transmission component are each in the engaged position, the first speed transmission component configured to transmit the combined power from the first output member toward the output shaft to drivingly rotate the output shaft within a first speed range in a first rotational direction;
    wherein, in a second forward transmission mode, the reverse transmission component and the first speed transmission component are each in the disengaged position and the forward transmission component and the second speed transmission component are each in the engaged position, the second speed transmission component configured to transmit the combined power from the second output member toward the output shaft to drivingly rotate the output shaft within a second speed range in the first rotational direction, the second speed range being different than the first speed range;
    wherein, in a reverse transmission mode, the forward transmission component and the second speed transmission component are each in the disengaged position and the reverse transmission component and the first speed transmission component are each in the engaged position, the first speed transmission component configured to transmit the combined power from the first output member toward the output shaft to drivingly rotate the output shaft in a second rotational direction that is opposite the first rotational direction;
    wherein, in a creeper transmission mode, the second speed transmission component is in the disengaged position and the creeper transmission component and the first speed transmission component are each in the engaged position to transmit the CVP power from the first output member toward the output shaft to drivingly rotate the output shaft within a creeper speed range that is lower than the first speed range; and
    wherein the forward transmission component, the first speed transmission component and the second speed transmission component are substantially coaxial with the first and second output members.

2. The powertrain of claim 1, wherein the plurality of transmission modes includes a second reverse transmission mode; and
    wherein, in the second reverse transmission mode, the forward transmission component and the first speed transmission component are each in the disengaged position and the reverse transmission component and the second speed transmission component are each in the engaged position, the second speed transmission component configured to transmit the combined power from the second output member toward the output shaft to drivingly rotate the output shaft in the second rotational direction.

3. The powertrain of claim 1, wherein, in the creeper transmission mode, the variator is configured to transmit the CVP power from the CVP to the first output member; and wherein, in the creeper transmission mode, the transmission does not transmit power directly from the engine to the first output member.

4. The powertrain of claim 1, wherein the output shaft is substantially coaxial with the forward transmission component, the first speed transmission component, the second speed transmission component and the first and second output members.

5. The powertrain of claim 1, wherein the CVP includes a first continuously variable machine (CVM) and a second CVM;

wherein, in the creeper transmission mode:
the engine provides power to the first CVM to generate power that is supplied to the second CVM;
the second CVM provides power to a first input member of the variator;
the second CVM provides power to a second input member of the variator; and
the variator recombines power from the first and second input members that is output to the first output member.

6. The powertrain of claim 5, wherein the first CVM is a first electric machine and the second CVM is a second electric machine.

7. The powertrain of claim 1, wherein, in the creeper transmission mode, the variator is configured to transmit the CVP power from the CVP to the first output member; and wherein, in the creeper transmission mode, the transmission does not transmit power directly from the engine to the first output member.

8. The powertrain of claim 1, wherein, in the creeper transmission mode, the transmission is configured to drivingly rotate the output shaft within the creeper speed range in the first rotational direction.

9. The powertrain of claim 1, wherein the transmission includes a third speed transmission component having an engaged position and a disengaged position; and wherein, in a third forward transmission mode, the reverse transmission component and the first and second speed transmission components are each in the disengaged position and the forward transmission component and the third speed transmission component are each in the engaged position to transmit the combined power from the first output member toward the output shaft to drivingly rotate the output shaft within a third speed range, the third speed range being different than the second speed range.

10. The powertrain of claim 9, wherein, in a second reverse transmission mode, the forward transmission component and the first speed transmission component are each in the disengaged position and the reverse transmission component and the second speed transmission component are each in the engaged position, the second speed transmission component configured to transmit the combined power from the second output member toward the output shaft to drivingly rotate the output shaft in the second rotational direction.

11. The powertrain of claim 10, wherein, in a third reverse transmission mode, the forward transmission component and the first and second speed transmission components are each in the disengaged position and the reverse transmission component and the third speed transmission component are each in the engaged position, the third speed transmission component configured to transmit the combined power from the first output member toward the output shaft to drivingly rotate the output shaft within in the second rotational direction.

12. The powertrain of claim 9, wherein the third speed transmission component is substantially coaxial with the first and second output members.

13. The powertrain of claim 9, wherein the third speed transmission component includes a brake and a planetary gearset with a plurality of gears; and wherein the brake, in the engaged position of the third speed transmission component, is configured to brake one of the plurality of gears.

14. The powertrain of claim 1, wherein, in the creeper transmission mode, the variator is configured to transmit the CVP power from the CVP to the first output member; and wherein, in the creeper transmission mode, the transmission does not transmit power directly from the engine to the first output member.

15. The powertrain of claim 14, wherein, in the creeper transmission mode, the transmission is configured to drivingly rotate the output shaft within the creeper speed range in the first rotational direction.

* * * * *